(12) United States Patent
Akita et al.

(10) Patent No.: US 6,523,699 B1
(45) Date of Patent: Feb. 25, 2003

(54) SULFONIC ACID GROUP-CONTAINING POLYVINYL ALCOHOL, SOLID POLYMER ELECTROLYTE, COMPOSITE POLYMER MEMBRANE, METHOD FOR PRODUCING THE SAME AND ELECTRODE

(75) Inventors: Hiroshi Akita, Wako (JP); Masao Ichikawa, Wako (JP); Masaru Iguchi, Wako (JP); Hiroyuki Oyanagi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/664,088

(22) Filed: Sep. 18, 2000

(30) Foreign Application Priority Data

Sep. 20, 1999 (JP) ............................................ 11-265115

(51) Int. Cl.$^7$ ......................... B01D 29/00; B01D 39/00; H01M 8/10
(52) U.S. Cl. ............ 210/490; 210/500.42; 210/500.27; 429/30; 429/33; 429/314
(58) Field of Search ........................... 210/500.42, 490, 210/500.38, 638, 500.27; 427/244; 429/30, 33

(56) References Cited

U.S. PATENT DOCUMENTS

| | | | |
|---|---|---|---|
| 4,361,632 A | 11/1982 | Weber et al. ................ | 429/145 |
| 4,505,998 A | 3/1985 | Hsu et al. .................... | 429/206 |
| 4,708,981 A | 11/1987 | Zupancic et al. ............. | 525/59 |
| 4,720,345 A * | 1/1988 | Linder et al | |
| 4,778,596 A * | 10/1988 | Linder et al. | |
| 5,039,421 A * | 8/1991 | Lider et al. | |
| 5,059,327 A * | 10/1991 | Takegami | |
| 5,409,785 A | 4/1995 | Nakano et al. ................ | 429/33 |
| 5,643,689 A | 7/1997 | Fleischer et al. ............. | 429/33 |
| 6,465,120 B1 * | 10/2002 | Akita et al. | |

FOREIGN PATENT DOCUMENTS

| | | |
|---|---|---|
| EP | 57042765 | 10/1982 |
| EP | 06035196 | 10/1994 |
| EP | 09227627 | 2/1997 |

OTHER PUBLICATIONS

Rhim et al, Modification of Poly(vinyl alcohol) Membranes Using Sulfer–succinic Acid and Its Application to Pervaporation Separation of Water–Alcohol Mixtures, 1998, pp. 1717–1723.

Kedem et al, Low–polarisation electrodialysis membranes, Sep. 20, 1998, pp. 305–314.

* cited by examiner

Primary Examiner—Ana Fortuna
(74) Attorney, Agent, or Firm—Lahive & Cockfield, LLP

(57) ABSTRACT

Sulfonic acid group-containing polyvinyl alcohol having crosslinked structures, which is obtained by heat treating a mixed solution of polyvinyl alcohol, a sulfonating agent and a crosslinking agent, a composite polymer membrane excellent in proton conductivity and methanol barrier property, which is obtained by applying the mixed solution to a water-absorptive or hydrophilic polymer membrane, followed by sulfonation and crosslinking, and an electrode for a fuel cell excellent in catalytic activity, which comprises sulfonic acid group-containing polyvinyl alcohol having crosslinked structures and fine catalyst particles carried on porous particles.

7 Claims, No Drawings

SULFONIC ACID GROUP-CONTAINING POLYVINYL ALCOHOL, SOLID POLYMER ELECTROLYTE, COMPOSITE POLYMER MEMBRANE, METHOD FOR PRODUCING THE SAME AND ELECTRODE

FIELD OF THE INVENTION

The present invention relates to polyvinyl alcohol having sulfonic acid group-containing side chains, a solid polymer electrolyte membrane, a composite polymer membrane, a method for producing the same and an electrode.

BACKGROUND OF THE INVENTION

In recent years, fuel cells have occupied an important position as next generation type clean energy sources. Of these fuel cells, a solid polymer electrolyte type fuel cell is one in which both anode and cathode electrodes are each arranged across a solid polymer electrolyte membrane intervening therebetween. For example, in the case of a direct methanol type fuel cell (hereinafter referred to as a "DMFC") in which methanol is used as a fuel, methanol is supplied to the anode side, and oxygen or air to the cathode side, thereby allowing electrochemical reaction to occur to generate electricity. Solid polymer electrolyte membranes having high proton conductivity have been developed for retaining the characteristics of their high output and high energy density, and for obtaining small-sized, lightweight fuel cells. The solid polymer electrolyte membrane used in the DMFC is required to have the barrier property to fuel methanol, that is to say, reduced permeability (cross-over) of fuel methanol from the anode side of the membrane to the cathode side thereof.

Previously, hydrated membranes of perfluorosulfonic acid polymers such as Nafion (trade name) manufactured by E. I. du Pont de Nemours and Company) have generally been used as the solid polymer electrolyte membranes.

The above-mentioned hydrated membranes of perfluorosulfonic acid polymers have high proton conductivity, and the proton conductivity is exhibited by the generation of a channel structure caused by hydration (conduction of hydrated protons). That is to say, the conduction of protons takes place through water as a medium in the hydrated membranes of perfluorosulfonic acid polymers, so that a specified amount of water exists in the hydrated membranes. Accordingly, methanol having high affinity with water easily passes through the membranes, so that the hydrated membranes of perfluorosulfonic acid polymers have a limitation with regard to the methanol barrier property.

As means for reducing the cross-over of methanol through the hydrated membranes of perfluorosulfonic acid polymers, composites of different kinds of materials based on the perfluorosulfonic acid polymer membranes may be mentioned. However, the above-mentioned composites have significantly lower proton conductivity than the essential one of the hydrated membranes of perfluorosulfonic acid polymers.

The materials to be used with the above-mentioned perfluorosulfonic acid polymer membranes include polyvinyl alcohol (hereinafter also referred to as "PVA") represented by the following general formula (I):

Crosslinked PVA can be used as water/alcohol separation membranes in prevaporation [Ji-Won Rhimet et al., *Journal of Applied Polymer Science*, 68, 1717 (1998)].

However, PVA is significantly low in proton conductivity, so that composite polymer membranes obtained by using the perfluorosulfonic acid polymer membranes and PVA are substantially decreased in performance (proton conductivity) required for the solid polymer electrolyte membranes. As a consequence, the composite polymer membranes of the perfluorosulfonic acid polymer membranes and PVA have been difficult to be utilized as the solid polymer electrolyte membranes.

Further, as an electrode used in a solid polymer electrolyte type fuel cell, a so-called MEA (membrane electrode assembly) is known. In the MEA, electrodes are formed of fine catalyst particles prepared by allowing carbon to support a noble metal, a solid polymer electrolyte component formed on surfaces of the fine catalyst particles, and a fluorine resin for adhering the fine catalyst particles to one another. The electrodes are each arranged on two main planes of a solid polymer electrolyte membrane, thereby constituting a part of a fuel cell (Japanese Unexamined Patent Publication No. 5-36418). Then, the development of solid polymer electrolyte components formed on the surfaces of the fine catalyst particles for electrodes has been desired.

SUMMARY OF THE INVENTION

The present invention has been made against a background of the current problems of the solid polymer electrolyte materials as described above.

An object of the invention is to provide polyvinyl alcohol having sulfonic acid group-containing side chains.

Another object of the invention is to provide a solid polymer electrolyte.

Still another object of the invention is to provide a composite polymer membrane excellent in proton conductivity and methanol barrier property.

A further object of the invention is to provide a method for producing the same.

A still further object of the invention is to provide an electrode excellent in catalytic activity.

The present inventors have conducted intensive investigation for attaining the above-mentioned objects. As a result, the inventors have discovered that the characteristics of a solid polymer electrolyte having proton conductivity can be imparted to PVA by introducing side chains having sulfonic acid groups and crosslinked structures into PVA, and further that a composite polymer membrane excellent in proton conductivity and methanol barrier property is obtained by applying PVA, a sulfonating agent and a crosslinking agent solution to a water-absorptive or hydrophilic polymer membrane, followed by sulfonation and crosslinking to produce the composite polymer membrane, thus completing the invention.

The inventors have further discovered that polyvinyl alcohol having sulfonic acid group-containing side chains and crosslinked structures is suitable for a solid polymer electrolyte formed on the surfaces of fine catalyst particles carried on porous particles for an electrode, thus completing the invention.

The invention provides PVA having sulfonic acid group-containing side chains and crosslinked structures.

In the above-mentioned sulfonic acid group-containing polyvinyl alcohol, the sulfonic acid group-containing side chains and the crosslinked structures are preferably bonded to a main chain of polyvinyl alcohol by COO and/or OCO bonds.

The invention further provides a solid polymer electrolyte comprising the above-mentioned sulfonic acid group-containing polyvinyl alcohol.

It is preferred that the above-mentioned solid polymer electrolyte has water absorption.

Still further, the invention provides a composite polymer membrane in which the sulfonic acid group-containing polyvinyl alcohol described in any one of the above is formed on a surface of a water-absorptive or hydrophilic polymer membrane.

Yet still further, the invention provides a method for producing the composite polymer membrane described above, which comprises applying a solution of PVA, a sulfonating agent and a crosslinking agent to a water-absorptive or hydrophilic polymer membrane, followed by sulfonation and crosslinking.

Furthermore, the invention provides an electrode comprising the solid polymer electrolyte described above and fine catalyst particles carried on porous particles.

DESCRIPTION OF THE PREFERRED EMBODIMENTS

The PVA of the invention having sulfonic acid group-containing side chains and crosslinked structures can be obtained by sulfonating commercially available PVA with a sulfonating agent.

The weight average molecular weight (Mw) of PVA used is preferably from 10,000 to 1,000,000, more preferably from 50,000 to 500,000, and particularly preferably from 89,000 to 98,000.

The number of carbon atoms of the sulfonic acid group-containing side chain is preferably from 1 to 10, more preferably from 1 to 5, and particularly preferably from 1 to 3, when it is aliphatic. The sulfonic acid group-containing side chains may contain aromatic rings.

The sulfonic acid group-containing side chains are preferably bonded to a main chain of PVA by COO and/or OCO bonds.

The term "COO and/or OCO bond" as used herein means an ester bond in which oxygen of the OH group of the main chain of PVA is combined with CO of the COOH group of the sulfonating agent.

For bonding the sulfonic acid group-containing side chains to the main chain of PVA by COO and/or OCO bonds, a sulfonating agent having a COOH group at its terminal end is preferably used.

The sulfonating agents used in the invention include, for example, sulfoacetic acid represented by the following chemical formula (II) and 4-sulfophthalic acid.

$$HOOC-CH_2-SO_3H \qquad (II)$$

Preferred is Sulfoacetic Acid.

In mixing the sulfonating agent, the sulfonating agent is added to an aqueous solution in which PVA is homogeneously dissolved, followed by stirring. As water used for the aqueous solution, deionized water or distilled water can appropriately be used. The concentration of the aqueous solution of PVA is preferably from 1% to 50% by weight, more preferably from 5% to 30% by weight, and particularly preferably about 10% by weight. The amount of the sulfonating agent used is preferably from 1 to 20 mole percent, more preferably from 1 to 10 mole percent, and particularly preferably from 1 to 5 mole percent, based on the OH groups of PVA. The stirring temperature is preferably from 0° C. to 100° C., and more preferably from 0° C. to 50° C. The stirring time is preferably from 1 to 24 hours, and more preferably from 6 to 12 hours.

For the preparation of the PVA of the invention having sulfonic acid group-containing side chains and crosslinked structures, a crosslinking agent is added together with the sulfonating agent to the aqueous solution in which PVA is homogeneously dissolved. The number of carbon atoms of the crosslinked structure is preferably from 1 to 10, more preferably from 1 to 6, and particularly preferably from 2 to 4, when it is aliphatic. The crosslinked structures may contain aromatic rings.

The crosslinked structures are preferably bonded to a main chain of PVA by COO and/or OCO bonds.

The term "COO and/or OCO bond" as used herein means an ester bond in which oxygen of the OH group of the main chain of PVA is combined with CO of the COOH group of the crosslinking agent.

For bonding the crosslinked structures to the main chain of PVA by COO and/or OCO bonds, a crosslinking agent having two or more COOH groups at its terminal ends is preferably used.

The crosslinking agents include sulfosuccinic acid represented by the following chemical formula (III), 4-sulfophthalic acid and poly(acrylic acid).

$$HOOC-CH_2-CH-COOH \atop | \atop SO_3H \qquad (III)$$

Preferred is Sulfosuccinic Acid.

The amount of the crosslinking agent used is preferably from 1 to 50 mole percent, more preferably from 1 to 20 mole percent, and particularly preferably from3 to 10 mole percent, based on the OH groups of PVA. Less than 1 mole percent makes the crosslinked membrane material water-soluble, whereas exceeding 50 mole percent causes the crosslinked membrane material to become brittle, resulting in easy occurrence of cracking.

For the preparation of the PVA of the invention, the sulfonating agent and the crosslinking agent are added to the aqueous solution of PVA, followed by stirring to prepare a cast solution. The temperature in vacuum evaporation is preferably from 0°C. to 200° C., and more preferably from 25° C. to 100° C. The PVA concentration of the cast solution is preferably from 1% to 50% by weight, more preferably from 5% to 30% by weight, and particularly preferably about 10% by weight.

The cast solution is cast on a glass plate, and water is evaporated, followed by vacuum evaporation. The cast solution can be cast by using a doctor blade or the like. Water is evaporated on a hot plate or in a vacuum drying oven by heating. The heating temperature is preferably from 0° C. to 100° C., and more preferably about 80° C. The temperature in the vacuum drying is preferably from 0° C. to 150° C., and more preferably from 25° C. to 100° C.

For conducting the sulfonation and the crosslinking treatment, the resulting membrane is heat treated preferably at 50° C. to 200° C., more preferably at 100° C. to 150° C., particularly preferably at about 120° C., preferably for 5 minutes to 12 hours, more preferably for 30 minutes to 6 hours, particularly preferably for about 1 hour. When the heat treatment temperature is less than 50° C., the sulfonation and the degree of crosslinking become insufficient. On the other hand, when it exceeds 200° C., deterioration of the membrane material is liable to occur. When the heat treatment time is less than 5 minutes, the sulfonation and the degree of crosslinking become insufficient. On the other hand, when it exceeds 12 hours, deterioration of the membrane material is liable to occur.

One example of the structure of the crosslinked structure-containing sulfonated PVA of the invention obtained by applying the sulfonating agent and the crosslinking agent to PVA is represented by the following general formula (IV):

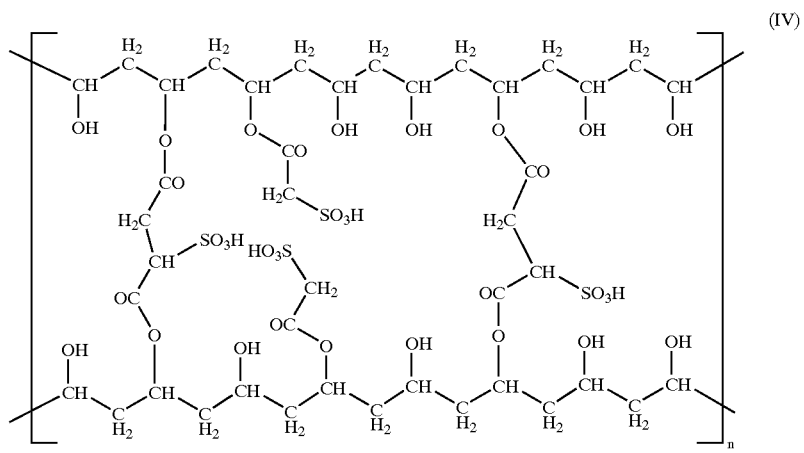

(IV)

The crosslinked structure-containing sulfonated PVA membrane obtained in the above-mentioned preparation is hydrated, and can be used as the solid polymer electrolyte membrane. The thickness of the solid polymer electrolyte membrane is preferably from 10 to 200 $\mu$m, and more preferably from 30 to 150 $\mu$m.

The composite polymer membrane comprising the sulfonic acid group-containing polyvinyl alcohol of the invention and the water-absorptive or hydrophilic polymer is obtained by applying the above-mentioned cast solution onto the water-absorptive or hydrophilic polymer membrane, vacuum drying the membrane coated with the cast solution preferably at 0° C. to 150° C., more preferably at about 80° C., and further heat treating it for sulfonation and crosslinking in a manner similar to the above.

The water-absorptive or hydrophilic polymers used in the invention include sulfonic acid group-containing water-absorptive polymers such as perfluorosulfonic acid polymers and sulfonated polyether ether ketone (PEEK). The perfluorosulfonic acid polymers include Nafion 112 (trade name) and Nafion 117 (trade name) manufactured by E. I. du Pont de Nemours and Company, and Flemion (trade name) manufactured by Asahi Glass Co., Ltd. Preferred are Nafion 112 and Nafion 117. The above-mentioned sulfonic acid group-containing water-absorptive polymers such as the perfluorosulfonic acid polymers and sulfonated polyether ether ketone (PEEK) show proton conductivity by hydration.

The thickness of the water-absorptive or hydrophilic polymer membrane (hereinafter referred to as a "Nafion membrane") used in the production of the composite polymer membrane of the invention is from 10 to 200 $\mu$m, and preferably from 30 to 100 $\mu$m.

It is preferred that pretreatment is conducted to the above-mentioned Nafion membrane before application of the cast solution.

In the pretreatment, the Nafion membrane is washed with deionized water, boiled in a 1.0 to 10.0 wt %, preferably about 3 wt % aqueous solution of hydrogen peroxide for 15 minutes to 6 hours, preferably for about 1 hour, boiled in deionized water for 15 minutes to 6 hours, preferably for about 1 hour, boiled in a 0.1 to 5 moles/liter, preferably about 0.5 mole/liter aqueous solution of sulfuric acid for 15 minutes to 6 hours, preferably for about 1 hour, and finally boiled in deionized water for 15 minutes to 6 hours, preferably for about 1 hour. This pretreatment gives the effect of removing organic impurities and metallic ions contained in the Nafion membrane and activating the sulfonic acid groups.

The PVA concentration of the cast solution applied herein is lower than that of the above-mentioned cast solution used for obtaining the PVA membrane by casting it on the glass plate, and evaporating water. The concentration is preferably from 1% to 15% by weight, more preferably from 1% to 10% by weight, and particularly preferably from 3% to 5% by weight. The amounts of the sulfonating agent and the crosslinking agent, based on the OH groups of PVA, are similar to those of the above-mentioned cast solution.

The application of the cast solution onto the Nafion membrane is carried out with a doctor blade, a spray or a brush. The cast solution may be applied onto either one side or both sides of the Nafion membrane. Vacuum drying, heat treatment and after treatment after coating are similar to those in the preparation of the above-mentioned PVA membrane.

The thickness of the PVA layer of the resulting composite polymer membrane is preferably 100 $\mu$m or less, and more preferably 30 $\mu$m or less.

Using as samples the membranes allowed to stand in deionized water at room temperature for 24 hours to equilibrate them, the proton conductivity of the single membranes or composite polymer membranes of PVA of the invention is measured as follows.

High frequency impedance measurements are made with an impedance analyzer "YHP 4192A" manufactured by YOKOGAWA-HEWLETT PACKARD, LTD. at room temperature at 750 mV, using four terminals or two terminals. The direct current component R is read from Cole-Cole plots, and the proton conductivity can be calculated therefrom.

The composite membranes of the invention show excellent proton conductivity, similarly to previously known Nafion membranes.

The single membranes or composite polymer membranes of PVA of the invention can be comprised in the solid polymer electrolyte membranes used in fuel cells, particularly in DMFCs.

The methanol barrier property of the solid polymer electrolyte membrane is measured in the following manner. The solid polymer electrolyte membrane having an area of 9 cm$^2$ is incorporated into a fuel cell to partition the cell into an anode chamber and a cathode chamber, and the cell is sealed. Keeping the cell temperature at 70° C., a 1 M aqueous solution of methanol pressurized to 0.5 kgf/cm$^2$ is supplied into the anode chamber at 0.5 ml/minute. Dry air is allowed to flow in the cathode chamber on the opposite side through an inlet at ordinary pressure, and a membrane-permeated material is collected with a cold trap of liquid nitrogen from a gas exhausted through an outlet. The permeation amount of methanol (g/cm$^2$) is calculated from the weight of the collected material (membrane-permeated material) and the composition determined by gas chromatographic analysis, which is employed as evaluation results of methanol permeability.

The permeation rate of methanol of the solid polymer electrolyte hydrated membranes of the invention is far lower than that of the conventional Nafion hydrated membranes, so that the membranes of the invention are excellent in methanol barrier property.

The sulfonated and crosslinked PVA (solid polymer electrolyte) of the invention can also be mixed with fine catalyst particles carried on the porous particles to use the resulting products as electrodes of fuel cells.

The electrodes of fuel cells usually include ones obtained by directly applying electrode paste comprising the fine catalyst particles carried on the porous particles and an alcohol solution of the solid polymer electrolyte which is an ion conductive component, onto a gaseous diffusion electrode base material, and removing the solvent. The electrode paste can also be directly applied onto the solid polymer electrolyte membranes.

The raw materials for the fine catalyst particles include platinum and an alloy of platinum and at least one selected from the group consisting of chromium, titanium and tungsten, and platinum is preferred.

The fine catalyst particles are used in the state that they are carried on the porous particles. As the porous particles, highly structured carbon particles having large average specific surface area, which are produced by the Ketjen process or the acetylene process, are suitably used.

The fine catalyst particles carried on the porous particles include a platinum catalyst carried on carbon, which is prepared by allowing carbon to support 10% to 30% by weight of platinum by a conventional method.

Methods for mixing the PVA of the invention with the fine catalyst particles carried on the porous particles (hereinafter referred to as a "platinum catalyst carried on carbon") include, for example, a method of mixing the above-mentioned cast solution with the platinum catalyst carried on carbon to form electrode paste to be applied onto the gaseous diffusion electrode base material. The heat treatments for sulfonation and crosslinking can be appropriately conducted in any process steps.

The electrode paste obtained by mixing the PVA of the invention with the platinum catalyst carried on carbon is applied onto the gaseous diffusion electrode base material, and dried to produce a catalyst electrode.

Further, the methods for mixing the PVA of the invention with the platinum catalysts carried on carbon also include a method of mixing the PVA of the invention and the platinum catalyst carried on carbon with a solvent to form electrode paste. For example, the PVA of the invention obtained by casting is pulverized, and mixed with the platinum catalyst carried on carbon.

As the solvents used in mixing the above-mentioned PVA with the platinum catalyst carried on carbon by stirring, any solvents can be used as long as they disperse the porous particles well and do not deteriorate the functions of the solid polymer electrolyte membranes. For example, ethylene glycol and a 50/50% (by volume) mixture of ethylene glycol monoisopropyl ether and isopropanol are suitably used. Further, solvents unreactive to oxygen such as water, ketones and esters can be added to and mixed with them to such a degree that rheological characteristics such as the kinematic viscosity of the electrode paste for formation of electrode catalyst layers are not impaired.

The order of mixing the PVA powder, the platinum catalyst carried on carbon and the solvent may be any, and can be appropriately selected. The resulting electrode paste is applied onto the gaseous diffusion electrode base materials by conventional procedures.

Here, the gaseous diffusion electrode base materials are so-called electron conductive supports, which include, for example, carbon paper and carbon cloth. In particular, the carbon paper is a porous base material, and particularly has many pores (voids) because it is produced by the papermaking method.

The gaseous diffusion electrode base materials and/or solid polymer electrolyte membranes can be coated with the electrode paste by the conventional kiss coat method, doctor blade method and screen printing method. The thickness of coating layers can be changed by adjusting the clearance of screen printing or a doctor blade. Although the thickness varies with the amounts of the platinum catalyst carried on carbon and the PVA constituting the electrode paste, it is usually within the range of 50 to 250 $\mu$m in the wet state. When the thickness is less than 50 $\mu$m, there is a fear of the insufficient catalyst amount. On the other hand, exceeding 250 $\mu$m results in the possibility of the surface state of a catalyst layer formed by drying and desolvation becoming unstable.

The electrode paste layers applied and fixed onto the gaseous diffusion electrode base materials are heated and dried in an inert gas atmosphere to remove the organic solvents contained in the paste, thereby forming the catalyst layers comprising the platinum catalysts carried on carbon and the PVA on the gaseous diffusion electrode base materials.

In this case, nitrogen or argon can be suitably used as the inert gas. First, alcohol components are removed at 50° C. to 80° C. at ordinary pressure, and then, organic solvents such as ethylene glycol can be removed by heating at the same temperature under reduced pressure.

The catalyst layers formed on the gaseous diffusion electrode base materials, which are obtained according to the above-mentioned steps, can be attached to the solid polymer electrolyte membranes by thermocompression bonding. The attachment can be suitably carried out at a temperature of 80° C. to 200° C., preferably 120° C. to 150° C., at a pressure of 20 to 200 kg/cm$^2$ by hot pressing. Under the conditions of a temperature of less than 80° C. and a pressure of less than 200 kg/cm$^2$, the attachment is insufficient. On the other hand, under the conditions of a temperature exceeding 200° C. and a pressure exceeding 200 kg/cm$^2$, there is a fear of decomposition of the PVA. Although the hot pressing time varies with the attachment temperature and pressure, it is usually from 30 to 120 seconds. A hot pressing time of less than 30 seconds results in a fear of insufficient attachment, whereas exceeding 120 seconds results in a fear of decomposition of the PVA, or deterioration or deformation of the gaseous diffusion electrode base materials and/or the solid polymer electrolyte membranes.

In the above-mentioned steps, the heat treatments for sulfonation and crosslinking at the time when the cast solutions are used can be appropriately conducted in any process steps. The conditions of the heat treatments for sulfonation and crosslinking are similar to those described above.

In the above-mentioned steps, fluorine resin (polytetrafluoroethylene resin) solutions and thickening agents ordinarily used as electrode constituting material components can be safely mixed, in addition to the platinum catalysts carried on carbon, the PVA and the solvents.

In the electrode catalysts in which surfaces of the fine catalyst particles are covered with the PVA of the invention, hydrated PVA shows excellent proton conductivity, so that the catalysts are excellent in catalytic activity. Further, the covering of the surfaces of the fine catalyst particles with the PVA shows the effect of preventing the catalysts from being poisoned without a decrease in catalytic activity. The amount of PVA that has covered the catalyst particles can be evaluated by measuring the amount of carbon monoxide (CO) absorbed.

The solid polymer electrolytes of the invention are excellent in proton conductivity and methanol barrier property, so that they are very useful as solid polymer electrolyte membrane materials for fuel cells, particularly for liquid supply type DMFCs. Further, the electrodes containing solid polymer electrolytes of the invention and the fine catalyst particles carried on the porous particles are high in activity, so that they are very useful as electrodes of fuel cells.

The present invention will be illustrated with reference to examples in more details below, but these examples are not intended to limit the scope of the present invention. Parts and percentages in the examples and comparative examples are on a weight basis, unless otherwise specified. Various evaluations were conducted as follows.

Proton Conductivity

A membrane allowed to stand in deionized water at room temperature for 24 hours to equilibrate it was used as a sample for proton conductivity measurements. High frequency impedance measurements were made with an impedance analyzer "YHP 4192A" manufactured by YOKOGAWA-HEWLETT PACKARD, LTD. at room temperature at 750 mV, using two terminals. The direct current component R was read from Cole-Cole plots, and the proton conductivity (S/cm) was calculated therefrom.

Methanol Barrier Property

A solid polymer electrolyte membrane having an area of 9 cm$^2$ was incorporated into a fuel cell to partition the cell into an anode chamber and a cathode chamber, and the cell is sealed. Keeping the cell temperature at 70° C., a 1 M aqueous solution of methanol pressurized to 0.5 kgf/cm$^2$ was supplied into the anode chamber at 0.5 ml/minute. Dry air was allowed to flow in the cathode chamber on the opposite side through an inlet at ordinary pressure, and a membrane-permeated material is collected with a cold trap of liquid nitrogen from a gas exhausted through an outlet. The permeation rate of methanol (g/cm$^2$) was calculated from the weight of the collected material and the composition determined by gas chromatographic analysis, which was employed as evaluation results of the methanol barrier property.

EXAMPLES 1 TO 6

Three grams of PVA (Mw=89,000 to 98,000) manufactured by Aldrich Chemical Co. Inc. was added to 30 ml of deionized water, and homogeneously dissolved by stirring at 90° C. for 6 hours. After cooling to room temperature, sulfosuccinic acid manufactured by Aldrich Chemical Co., Inc. as a crosslinking agent and sulfoacetic acid as a sulfonating agent were added in amounts shown in Table 1, followed by stirring overnight at room temperature to obtain cast solutions. In Table 1, the amount of the crosslinking agent is indicated in mole percent based on the whole OH groups in PVA, and the amount of the sulfonating agent is indicated in mole percent based on OH groups not crosslinked by the crosslinking agent, of the whole OH groups in PVA.

The cast solutions were each poured on glass plates, and cast with a doctor blade, followed by evaporation of water on a hot plate at 80° C. Further, vacuum drying was carried out at 80° C. for 6 hours to obtain PVA membranes. The resulting PVA membranes were heat treated at 120° C. for 1 hour to conduct sulfonation and crosslinking. The PVA membranes thus obtained had a thickness of 30 to 120 μm. Results of evaluations for the resulting membranes are shown in Table 1.

EXAMPLES 7 TO 9

Nafion 112 membranes (each having a thickness of 50 μm) manufactured by E. I. du Pont de Nemours and Company were washed with deionized water, boiled in a 3% aqueous solution of hydrogen peroxide for 1 hour, boiled in deionized water for 1 hour, boiled in a 0.5 mole/liter aqueous solution of sulfuric acid for 1 hour, and finally boiled in deionized water for 1 hour. The treated membranes were allowed to stand in deionized water at.room temperature for 24 hours.

A cast solution was prepared in the same manner as with Examples 1 to 6 with the exception that the amount of the crosslinking agent and the amount of the sulfonating agent were changed as shown in Table 1. The cast solution was applied onto surfaces of the Nafion membranes treated as described above with a doctor blade, and vacuum dried at 80° C. for 1 hour, followed by heat treatment at 120° C. for 1 hour to conduct sulfonation and crosslinking. The composite PVA polymer membranes thus obtained had a thickness of 60 to 100 μm. Results of evaluations for the resulting composite polymer membranes are shown in Table 1.

COMPARATIVE EXAMPLE 1

A single membrane of Nafion 112 manufactured by E. I. du Pont de Nemours and Company was evaluated. Results thereof are shown in Table 1.

COMPARATIVE EXAMPLE 2

A PVA membrane (having a thickness of 50 μm) was prepared in the same manner as with Examples 1 to 6 with the exception that the sulfonating agent was not used. Results thereof are shown in Table 1. The structure of the crosslinked structure-containing PVA membrane obtained using no sulfonating agent is represented by the following general formula (V):

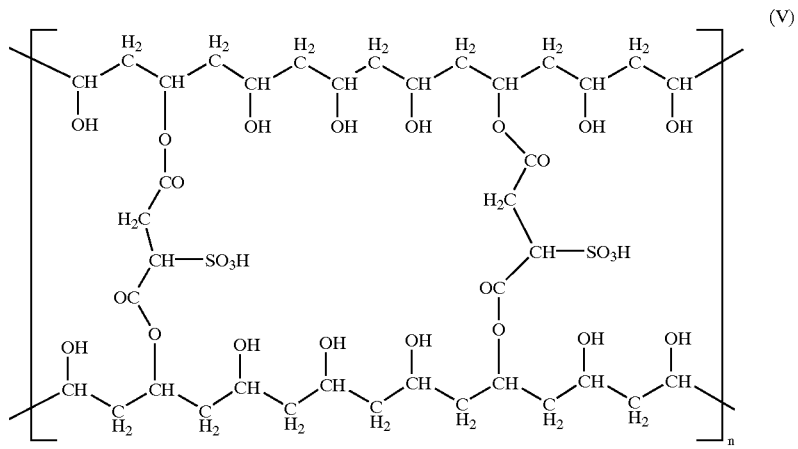

TABLE 1

| | Compounding Amount of Cast Solution | | | PVA Membrane or Composite Membrane | |
|---|---|---|---|---|---|
| | Water (ml) | Cross-linking Agent mol %*1 | Sulfo-nating Agent Mol %*2 | Proton Conduc-tivity (S/cm) | Permeation Rate of MeOH (g/ min · cm$^2$) |
| Example 1 | 30 | 3 | 1 | $9.6 \times 10^{-4}$ | — |
| Example 2 | 30 | 3 | 3 | $1.7 \times 10^{-2}$ | — |
| Example 3 | 30 | 3 | 5 | $2.2 \times 10^{-3}$ | — |
| Example 4 | 30 | 5 | 1 | $2.3 \times 10^{-3}$ | — |
| Example 5 | 30 | 5 | 3 | $4.4 \times 10^{-3}$ | — |
| Example 6 | 30 | 5 | 5 | $4.4 \times 10^{-3}$ | — |
| Example 7 | 30 | 0.5 | 0.5 | $9.4 \times 10^{-3}$ | $1.5 \times 10^{-4}$ |
| Example 8 | 30 | 1.2 | 1.2 | $1.1 \times 10^{-2}$ | $1.6 \times 10^{-4}$ |
| Example 9 | 30 | 2.5 | 2.5 | $1.3 \times 10^{-2}$ | $1.5 \times 10^{-4}$ |
| Comparative Example 1 | — | — | — | $1.2 \times 10^{-2}$ | $1.7 \times 10^{-3}$ |
| Comparative Example 2 | — | — | — | $3.0 \times 10^{-3}$ | $1.1 \times 10^{-4}$ |

*1: The amount of the crosslinking agent is indicated in mole percent based on the whole OH groups in PVA.
*2: The amount of the sulfonating agent is indicated in mole percent based on OH groups not crosslinked by the crosslinking agent, of the whole OH groups in PVA.

The results of Table 1 reveals that the sulfonated crosslinked PVA membranes of Examples 1 to 6 are excellent in proton conductivity, compared with the crosslinked PVA membrane of Comparative Example 2. The composite polymer membranes of Examples 7 to 9 have proton conductivity equal to that of the Nafion membrane of Comparative Example 1, and are excellent in methanol barrier property, compared with the Nafion membrane.

The composite polymer membranes of the invention are excellent in proton conductivity and methanol barrier property, and useful as solid polymer electrolyte membranes for fuel cells, particularly for DMFCs.

The PVA of the invention having sulfonic acid group-containing side chains and crosslinked structures, and the electrodes containing the platinum catalysts carried on carbon are suitable as electrodes for fuel cells.

What is claimed is:

1. A composite polymer membrane in which a membrane of the sulfonic acid group-containing polyvinyl alcohol having sulfonic acid group-containing side chains and crosslinked structures is formed on a surface of a polymer membrane showing proton conductivity by hydration.

2. A composite polymer membrane in which a membrane of the sulfonic acid group-containing polyvinyl alcohol is formed on a surface of a polymer membrane showing proton conductivity by hydration,
   wherein said polyvinyl alcohol has sulfonic acid group-containing side chains and crosslinked structures bonded to a main of the polyvinyl alcohol by COO and/or OCO bonds.

3. A solid polymer electrolyte comprising the sulfonic acid group-containing polyvinyl alcohol according to claim 1 or 2.

4. The solid polymer electrolyte according to claim 3, which has water absorption.

5. An electrode comprising the solid polymer electrolyte according to claim 4 and fine catalyst particles carried on porous particles.

6. An electrode comprising solid polymer electrolyte according to claim 3 and fine catalyst particles carried on porous particles.

7. A method for producing the composite polymer membrane according to claims 1 or 2,
   which comprises applying a solution of polyvinyl alcohol, a sulfonating agent and a crosslinking agent to a polymer membrane showing proton conductivity by hydration, followed by sulfonation and crosslinking.

* * * * *

UNITED STATES PATENT AND TRADEMARK OFFICE
CERTIFICATE OF CORRECTION

PATENT NO.     : 6,523,699 B1
DATED          : February 25, 2003
INVENTOR(S)    : Akita et al.

It is certified that error appears in the above-identified patent and that said Letters Patent is hereby corrected as shown below:

Column 4,
Line 41, replace "from3 to 10 mole" with -- from 3 to 10 mole --;

Column 10,
Line 43, replace "water at.room temperature" with -- water at room temperature --;
Line 65, replace "not used.Results" with -- not used. Results --;

Column 12,
Line 40, replace "to a main of the" with -- to a main chain of the --;

Signed and Sealed this

Sixteenth Day of December, 2003

JAMES E. ROGAN
*Director of the United States Patent and Trademark Office*